United States Patent
Choi

(10) Patent No.: US 11,366,725 B2
(45) Date of Patent: Jun. 21, 2022

(54) STORAGE DEVICE AND METHOD OF OPERATING THE SAME

(71) Applicant: SK hynix Inc., Gyeonggi-do (KR)

(72) Inventor: Hyeong Jae Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 90 days.

(21) Appl. No.: 16/898,056

(22) Filed: Jun. 10, 2020

(65) Prior Publication Data

US 2021/0200647 A1 Jul. 1, 2021

(30) Foreign Application Priority Data

Dec. 30, 2019 (KR) .................. 10-2019-0178579

(51) Int. Cl.
| | |
|---|---|
| *G06F 12/00* | (2006.01) |
| *G06F 11/14* | (2006.01) |
| *G06F 12/02* | (2006.01) |
| *G06F 9/54* | (2006.01) |
| *G06F 11/20* | (2006.01) |

(52) U.S. Cl.
CPC .......... *G06F 11/1469* (2013.01); *G06F 9/546* (2013.01); *G06F 11/1451* (2013.01); *G06F 11/1461* (2013.01); *G06F 11/2056* (2013.01); *G06F 12/0246* (2013.01); *G06F 2212/7201* (2013.01)

(58) Field of Classification Search
CPC ...... G06F 3/0646; G06F 3/0647; G06F 3/065; G06F 11/1446; G06F 11/1469; G06F 11/1451; G06F 11/1461; G06F 11/2056; G06F 9/546; G06F 12/0246; G06F 2212/7201

See application file for complete search history.

(56) References Cited

U.S. PATENT DOCUMENTS

2005/0055523 A1* 3/2005 Suishu ................ G06F 11/2064
                                                    711/165
2017/0206020 A1* 7/2017 Brown .................... G06F 3/067

FOREIGN PATENT DOCUMENTS

| KR | 10-1930117 | 12/2018 |
|---|---|---|
| KR | 10-2019-0032839 | 3/2019 |

* cited by examiner

*Primary Examiner* — Shawn X Gu
(74) *Attorney, Agent, or Firm* — IP & T Group LLP

(57) ABSTRACT

The present technology relates to an electronic device. A storage device according to the present technology includes a memory device including a plurality of logical storage areas, and a memory controller. The memory controller controls the memory device to perform a memory operation on an original storage area of the plurality of logical storage areas according to a request of a host, and to perform a mirroring operation of copying the memory operation which was performed on the original storage area in a backup storage area of the plurality of logical storage areas based on whether the memory device is in an idle state.

20 Claims, 15 Drawing Sheets

STORAGE DEVICE AND METHOD OF OPERATING THE SAME

CROSS-REFERENCE TO RELATED APPLICATION

The present application claims priority under 35 U.S.C. § 119(a) to Korean patent application number 10-2019-0178579, filed on Dec. 30, 2019, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device in which data is stored and a memory controller for controlling the memory device. The memory device is divided into a volatile memory device and a non-volatile memory device.

The volatile memory device is a device that stores data only when power is supplied and loses the stored data when the power supply is cut off. The volatile memory device includes a static random access memory (SRAM), a dynamic random access memory (DRAM), and the like.

The non-volatile memory device is a device that does not lose data even though power is cut off. The non-volatile memory devices include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having improved backup performance, and a method of operating the same.

A storage device according to an embodiment of the present disclosure includes a memory device including a plurality of logical storage areas, and a memory controller. The memory controller controls the memory device to perform a memory operation on an original storage area of the plurality of logical storage areas according to a request of a host, and to perform a mirroring operation of copying the memory operation which was performed on the original storage area in a backup storage area of the plurality of logical storage areas based on whether the memory device is in an idle state.

A method of operating a storage device including a mirroring queue, an original storage area, and a backup storage area includes queuing, in the mirroring queue, at least one mirroring command for a mirroring operation of copying a memory operation which was performed on the original storage area in the backup storage area, and performing the mirroring operation according to the queued mirroring command based on whether the storage device is in an idle state.

According to the present technology, the storage device having improved backup performance, and a method of operating the same are provided.

DETAILED DESCRIPTION

Hereinafter, an embodiment of the present disclosure will be described in detail with reference to the accompanying drawings.

Figure 1:
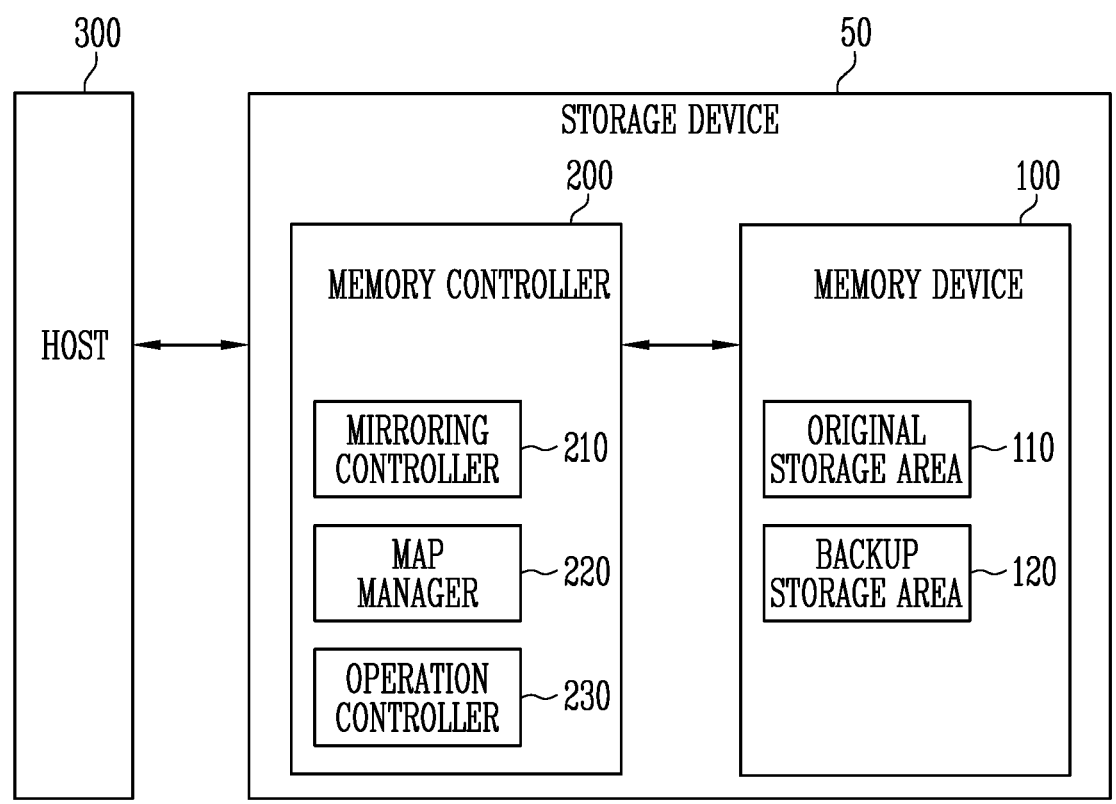
FIG. 1 is a diagram for describing a storage device according to an embodiment of the present disclosure.

FIG. 1 is a diagram for describing a storage device 50 according to an embodiment of the present disclosure.

Referring to FIG. 1, the storage device 50 may include a memory device 100 and a memory controller 200 that controls an operation of the memory device. The storage device 50 may store data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with a host 300. For example, the storage device 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) capable of storing one data bit, a multi-level cell (MLC) capable of storing two data bits, a triple level cell (TLC) capable of storing three data bits, or a quad level cell (QLC) capable of storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access an area of the memory cell array which is selected by the address. That is, the memory device 100 may perform an operation instructed by the command on the area selected by the address. For example, the memory device 100 may perform a write operation (i.e., a program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

In an embodiment, the memory device 100 may include a plurality of logical storage areas. The plurality of logical storage areas may be areas in which a plurality of physically divided storage spaces of the memory device 100 are logically grouped. The memory device 100 may include an original storage area 110 and a backup storage area 120 used for mirroring the original storage area among the plurality of logical storage areas. The number of backup storage areas 120 is not limited to the present embodiment.

The memory controller 200 controls overall operations of the storage device 50.

When power is applied to the storage device 50, the memory controller 200 may execute firmware. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the logical block address (LBA) into a physical block address (PBA) indicating an address of memory cells storing data, included in the memory device 100.

The memory controller 200 may control the memory device 100 to perform the program operation, the read operation, or the erase operation in response to a request from the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide a command, an address, and data to the memory device 100 to perform background operations such as a program operation for wear leveling and a program operation for garbage collection.

In an embodiment, the memory controller 200 may control at least two memory devices. In this case, the memory controller 200 may control the memory devices according to an interleaving method to improve operation performance. The interleaving method may be an operation method for overlapping operation periods of at least two memory devices.

In an embodiment, the memory controller 200 may logically group the plurality of physically divided storage spaces of the memory device 100 in response to a logical area setting command received from the host 300. The logically grouped storage areas may be logical storage areas. That is, the logical area setting command may be a command for allocating the plurality of physically divided storage spaces of the memory device 100 to at least one or more logical storage areas, based on a logical address.

The memory controller 200 may set an original storage area 110 among the plurality of logical storage areas of the memory device 100, and a backup storage area 120 used for mirroring the original storage area 110, in response to the logical area setting command.

The memory controller 200 may include a mirroring controller 210 and a map manager 220. The mirroring controller 210 may control the memory device 100 to perform a mirroring operation of copying (or reproducing) a memory operation performed on the original storage area 110 in the backup storage area 120. The memory operation may be a program operation or an erase operation.

For example, when a program operation of storing data in the original storage area 110 is performed, the mirroring controller 210 may control the memory device to store the same data as the data, which is stored in the original storage area 110, in the backup storage area 120. When an erase operation is performed on a selected area of the original storage area 110, the mirroring controller 210 may control the memory device to erase a target area of the backup storage area 120 corresponding to the selected area of the original storage area 110.

The mirroring controller 210 may determine whether the memory operation is performed on the original storage area 110. When it is determined that the memory operation is performed, the mirroring controller 210 may control the memory device 100 to perform the mirroring operation.

The mirroring controller 210 may determine whether the memory device 100 is in an idle state. When it is determined that the memory device 100 is in the idle state, the mirroring controller 210 may control the memory device 100 to perform the mirroring operation. The idle state may be a state in which the memory device 100 does not perform any operations according to a request of the host 300.

In an embodiment, when the memory device 100 is in the idle state, the mirroring controller 210 may determine whether the memory operation is performed on the original storage area 110 and control the memory device 100 to perform the mirroring operation in a background method. In another embodiment, after the memory operation is performed on the original storage area 110, the mirroring controller 210 may determine whether the memory device 100 is in the idle state and control the memory device 100 to perform the mirroring operation in the background method.

The map manager 220 may store a mapping table corresponding to each of the plurality of logical storage areas. In an embodiment, the map manager 220 may store an original mapping table corresponding to the original storage area 110 and a backup mapping table corresponding to the backup storage area 120.

When the memory operation is performed, the map manager 220 may update the original mapping table and the backup mapping table. Specifically, the map manager 220 may update the original mapping table so that a physical address indicating the original storage area 110 on which the memory operation is performed and a logical address of the original storage area 110 received from the host 300 are mapped to each other. The map manager 220 may update the backup mapping table so that a physical address indicating the original storage area 110 and a logical address of the backup storage area 120 are mapped to each other. The logical address of the backup storage area 120 may correspond to the logical address of the original storage area 110. When the memory operation is performed but the mirroring operation is not performed, the latest valid data may be stored in the original storage area 110. Therefore, the logical address of the backup storage area 120 may be mapped to the physical address indicating the original storage area 110 rather than the physical address indicating the backup storage area 120.

Since the logical address of the backup storage area 120 is mapped to the physical address indicating the original storage area 110, the latest valid data may be normally read even though the read operation is performed based on the logical address of the backup storage area 120 before the mirroring operation is performed.

The map manager 220 may update the backup mapping table when the mirroring operation is performed. Specifically, the map manager 220 may update the backup mapping table so that the physical address indicating the backup storage area 120 on which the mirroring operation is performed and the logical address of the backup storage area 120 are mapped to each other. This is because when the mirroring operation is performed, the memory operation is copied in the backup storage area 120, and the latest valid data is stored in the backup storage area 120.

In an embodiment, the memory controller 200 may further include an operation controller 230.

The operation controller 230 may control the memory device 100 to perform the memory operation on the original storage area 110 in response to the request from the host 300. The memory operation may include a program operation of storing data in the original storage area 110. The memory operation may include an erase operation of erasing a selected storage area of the original storage area 110.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
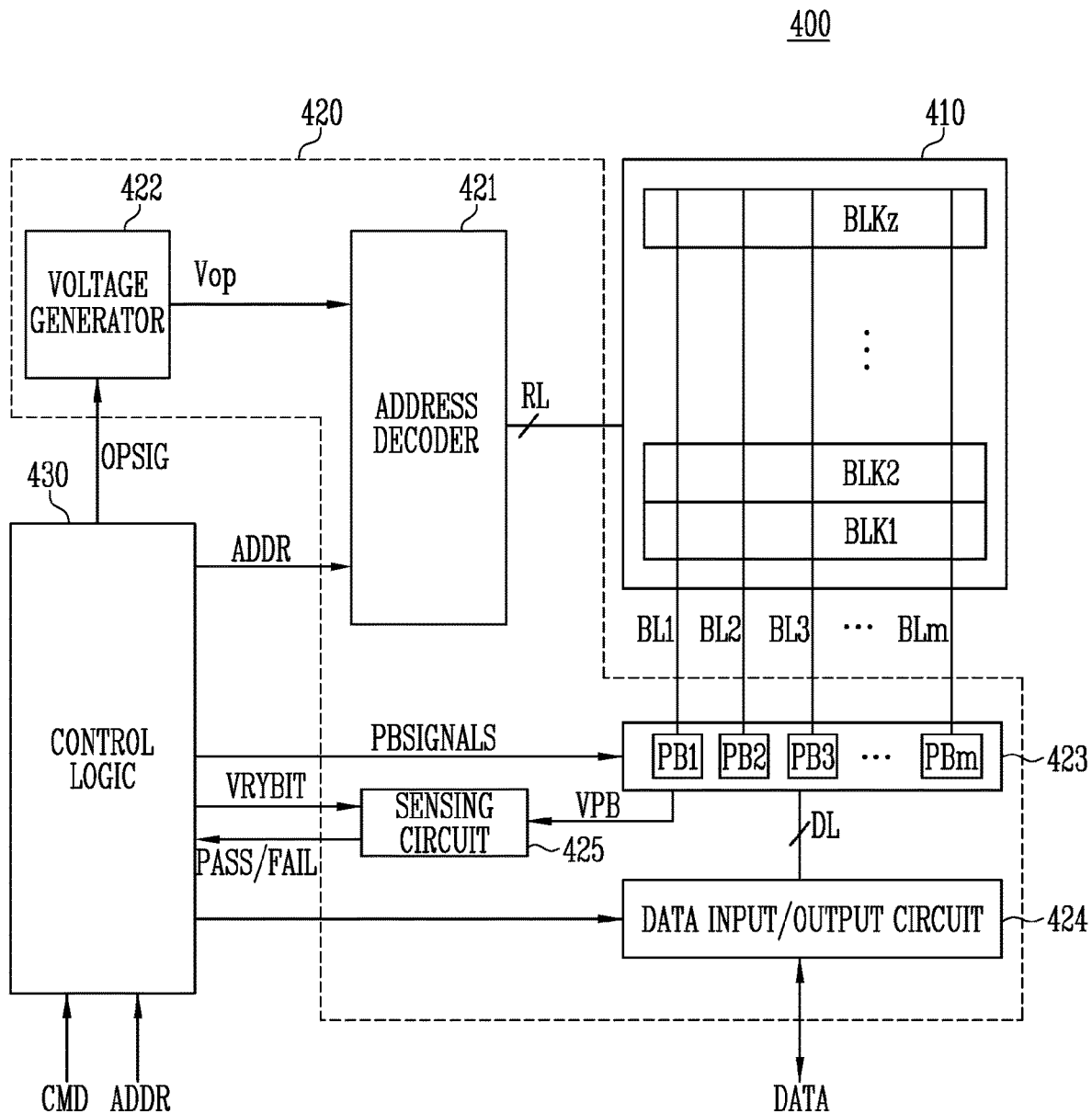
FIG. 2 is a diagram for describing a memory device of FIG. 1.

FIG. 2 is a diagram for describing the memory device 100 of FIG. 1. A memory device 400 may correspond to the memory device 100 of FIG. 1.

Referring to FIG. 2, the memory device 400 may include a memory cell array 410, a peripheral circuit 420, and a control logic 430.

The memory cell array 410 includes a plurality of memory blocks BLK1 to BLKz. The plurality of memory blocks BLK1 to BLKz are connected to an address decoder 421 through row lines RL. The plurality of memory blocks BLK1 to BLKz are connected to a read and write circuit 423 through bit lines BL1 to BLm. Each of the plurality of memory blocks BLK1 to BLKz includes a plurality of memory cells. As an embodiment, the plurality of memory cells are non-volatile memory cells. Memory cells connected to the same word line among the plurality of memory cells are defined as one physical page. That is, the memory cell array 410 is configured of a plurality of physical pages. In an embodiment, each of the plurality of memory blocks BLK1 to BLKz included in the memory cell array 410 may include a plurality of dummy cells. At least one of the dummy cells may be connected in series between a drain select transistor and the memory cells, and between a source select transistor and the memory cells.

Each of the memory cells of the memory device 400 may be configured as a single level cell (SLC) capable of storing one data bit, a multi-level cell (MLC) capable of storing two data bits, a triple level cell (TLC) capable of storing three data bits, or a quad level cell (QLC) capable of storing four data bits.

The peripheral circuit 420 may include an address decoder 421, a voltage generator 422, the read and write circuit 423, a data input/output circuit 424, and a sensing circuit 425.

The peripheral circuit 420 drives the memory cell array 410. For example, the peripheral circuit 420 may drive the memory cell array 410 to perform a program operation, a read operation, and an erase operation.

The address decoder 421 is connected to the memory cell array 410 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 421 is configured to operate in response to control of the control logic 430. The address decoder 421 receives an address ADDR from the control logic 430.

The address decoder 421 is configured to decode a block address of the address ADDR. The address decoder 421 selects at least one memory block among the memory blocks BLK1 to BLKz according to the decoded block address. The address decoder 421 is configured to decode a row address of the address ADDR. The address decoder 421 may select at least one word line among word lines of a selected memory block according to the decoded row address. The address decoder 421 may apply an operation voltage Vop received from the voltage generator 422 to the selected word line.

During the program operation, the address decoder 421 may apply a program voltage to a selected word line and apply a pass voltage having a level less than that of the program voltage to unselected word lines. During a program verify operation, the address decoder 421 may apply a verify voltage to the selected word line and apply a verify pass voltage having a level greater than that of the verify voltage to the unselected word lines.

During the read operation, the address decoder 421 may apply a read voltage to the selected word line and apply a read pass voltage having a level greater than that of the read voltage to the unselected word lines.

In an embodiment, the erase operation of the memory device 400 is performed in memory block units. The address ADDR input to the memory device 400 during the erase operation includes a block address. The address decoder 421 may decode the block address and select at least one memory block according to the decoded block address. During the erase operation, the address decoder 421 may apply a ground voltage to the word lines input to the selected memory block.

In an embodiment, the address decoder 421 may be configured to decode a column address of the transferred address ADDR. The decoded column address may be transferred to the read and write circuit 423. As an example, the address decoder 421 may include a component such as a row decoder, a column decoder, and an address buffer.

The voltage generator 422 is configured to generate a plurality of operation voltages Vop by using an external power voltage supplied to the memory device 400. The voltage generator 422 operates in response to the control of the control logic 430.

As an example, the voltage generator 422 may generate an internal power voltage by regulating the external power voltage. The internal power voltage generated by the voltage generator 422 is used as an operation voltage of the memory device 400.

In an embodiment, the voltage generator 422 may generate the plurality of operation voltages Vop using the external power voltage or the internal power voltage. The voltage generator 422 may be configured to generate various voltages required by the memory device 400. For example, the voltage generator 422 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 422 may include a plurality of pumping capacitors that receive the internal voltage and selectively activate the plurality of pumping capacitors in response to the control logic 430 to generate the plurality of operation voltages Vop.

The plurality of generated operation voltages Vop may be supplied to the memory cell array 410 by the address decoder 421.

The read and write circuit 423 includes first to m-th page buffers PB1 to PBm. The first to m-th page buffers PB1 to PBm are connected to the memory cell array 410 through first to m-th bit lines BL1 to BLm, respectively. The first to m-th page buffers PB1 to PBm operate in response to the control of the control logic 430.

The first to m-th page buffers PB1 to PBm communicate data DATA with the data input/output circuit 424. At a time of program, the first to m-th page buffers PB1 to PBm receive the data DATA to be stored through the data input/output circuit 424 and data lines DL.

During the program operation, when a program voltage is applied to the selected word line, the first to m-th page buffers PB1 to PBm may transfer the data DATA to be stored, that is, the data DATA received through the data input/output circuit 424 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 423 may read the data DATA from the memory cells of the selected page through the bit lines BL and store the read data DATA in the first to m-th page buffers PB1 to PBm.

During the erase operation, the read and write circuit 423 may float the bit lines BL. In an embodiment, the read and write circuit 423 may include a column selection circuit (not illustrated).

The data input/output circuit 424 is connected to the first to m-th page buffers PB1 to PBm through the data lines DL. The data input/output circuit 424 operates in response to the control of the control logic 430.

The data input/output circuit 424 may include a plurality of input/output buffers (not shown) that receive input data DATA. During the program operation, the data input/output circuit 424 receives the data DATA to be stored from an external controller (not shown). During the read operation, the data input/output circuit 424 outputs the data DATA transferred from the first to m-th page buffers PB1 to PBm included in the read and write circuit 423 to the external controller.

During the read operation or the verify operation, the sensing circuit 425 may generate a reference current in response to a signal of a permission bit VRYBIT generated by the control logic 430 and may compare a sensing voltage VPB received from the read and write circuit 423 with a reference voltage generated by the reference current to output a pass signal or a fail signal to the control logic 430.

The control logic 430 may be connected to the address decoder 421, the voltage generator 422, the read and write circuit 423, the data input/output circuit 424, and the sensing circuit 425. The control logic 430 may be configured to control all operations of the memory device 400. The control logic 430 may operate in response to a command CMD transferred from an external device.

The control logic 430 may generate various signals in response to the command CMD and the address ADDR to control the peripheral circuit 420. For example, the control logic 430 may generate an operation signal OPSIG, a read and write circuit control signal PBSIGNALS, and the permission bit VRYBIT in response to the command CMD and the address ADDR. The control logic 430 may output the operation signal OPSIG to the voltage generator 422, output the address ADDR to the address decoder 421, output the read and write circuit control signal PBSIGNALS to the read and write circuit 423, and output the permission bit VRYBIT to the sensing circuit 425. In addition, the control logic 430 may determine whether the verify operation is passed or failed in response to the pass or fail signal PASS/FAIL output by the sensing circuit 425.

Figure 3:
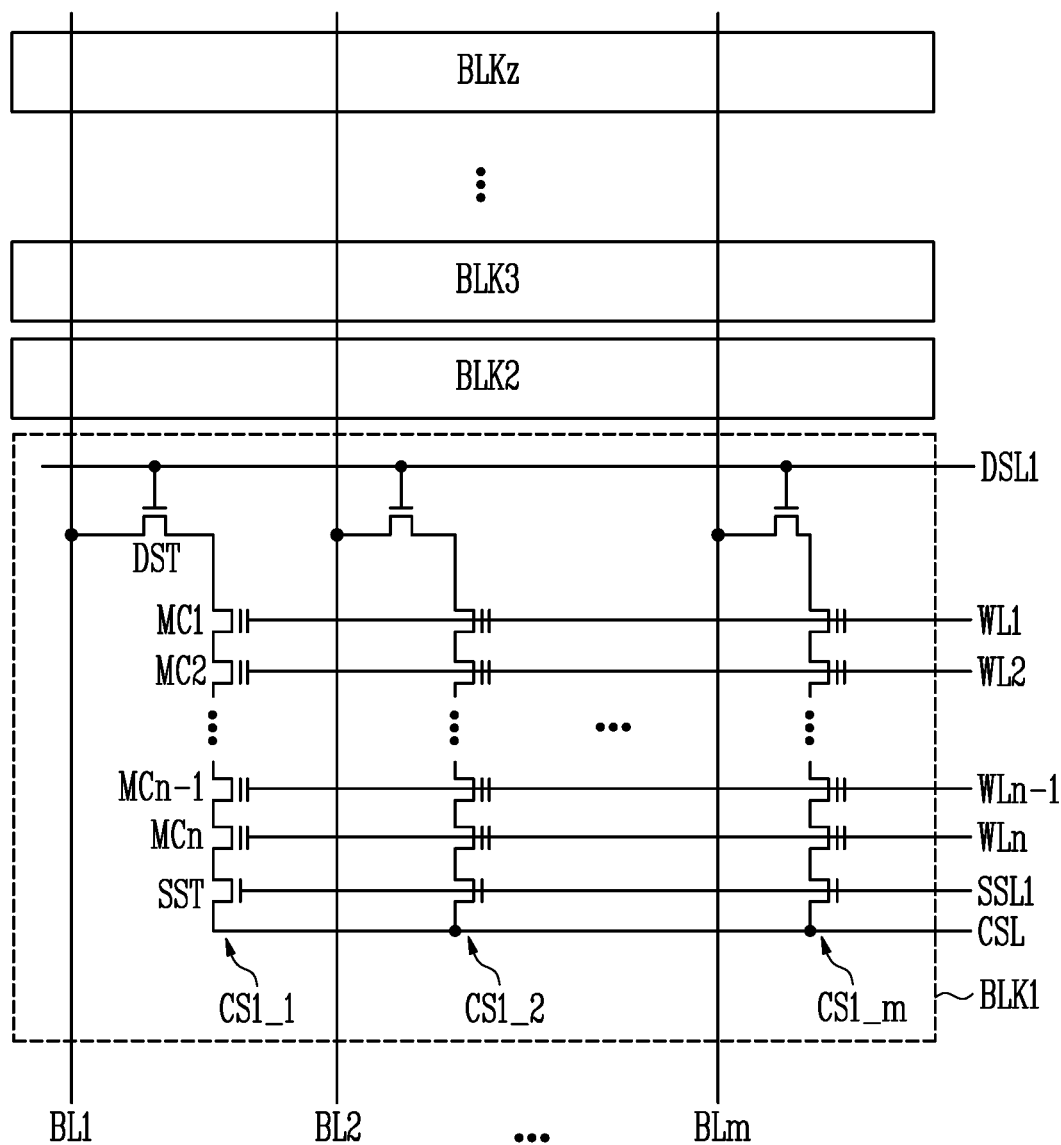
FIG. 3 is a detailed diagram of a memory cell array of FIG. 2.

FIG. 3 is a detailed diagram of the memory cell array 410 of FIG. 2.

Referring to FIG. 3, the first to z-th memory blocks BLK1 to BLKz are commonly connected to the first to m-th bit lines BL1 to BLm. In FIG. 3, for convenience of description, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz is configured similarly to the first memory block BLK1.

The memory block BLK1 may include a plurality of cell strings CS1_1 to CS1_$m$, where m is a positive integer. The first to m-th cell strings CS1_1 to CS1_$m$ are connected to the first to m-th bit lines BL1 to BLm, respectively. Each of the first to m-th cell strings CS1_1 to CS1_$m$ includes a drain select transistor DST, a plurality of memory cells MC1 to MCn connected in series, where n is a positive integer, and a source select transistor SST.

Gate terminals of the drain select transistors DST included in each of the first to m-th cell strings CS1_1 to CS1_$m$ are connected to a drain select line DSL1. Gate terminals of the first to n-th memory cells MC1 to MCn included in each of the first to m-th cell strings CS1_1 to CS1_$m$ are connected to the first to n-th word lines WL1 to WLn, respectively. Gate terminals of the source select transistors SST included in each of the first to m-th cell strings CS1_1 to CS1_$m$ are connected to a source select line SSL1.

For convenience of description, a structure of the cell string will be described with reference to the first cell string CS1_1 of the plurality of cell strings CS1_1 to CS1_$m$. However, it will be understood that each of the remaining cell strings CS1_2 to CS1_$m$ is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. As an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 421. The common source line CSL is controlled by the control logic 430. The first to m-th bit lines BL1 to BLm are controlled by the read and write circuit 423.

Figure 4:
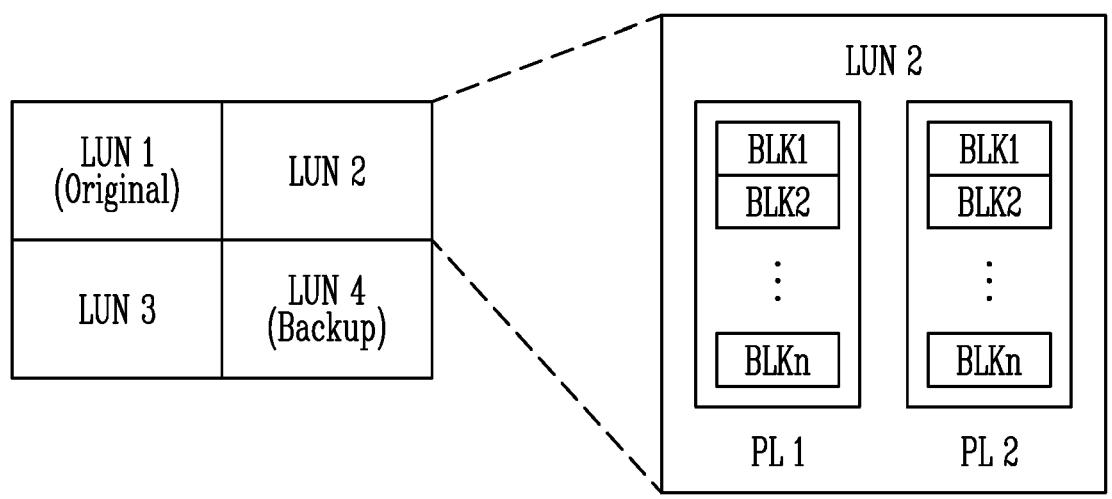
FIG. 4 is a diagram for describing a logical storage area according to an embodiment of the present disclosure.

FIG. 4 is a diagram for describing a logical storage area according to an embodiment.

Referring to FIG. 4, the memory cell array 410 described with reference to FIG. 2 may include a plurality of logical storage areas. The plurality of logical storage areas may be areas in which the plurality of physically divided storage spaces of the memory cell array 410 are logically grouped. The logically grouped storage area may be a logical unit number (LUN).

Each logical storage area may include at least one plane (PL). The plane may be a unit in which the program operation, the erase operation, and the read operation are independently performed. The plane may include at least one memory block.

In FIG. 4, the memory cell array 410 may include first to fourth logical storage areas LUN 1 to LUN 4. The number of logical storage areas included in the memory cell array 410 is not limited to the present embodiment.

For example, the second logical storage area LUN 2 may include first and second planes PL 1 and PL 2. Each plane may include first to n-th memory blocks BLK1 to BLKn. The number of planes included in the logical storage area and the number of memory blocks included in the plane are not limited to the present embodiment.

Each logical storage area may have the same structure. Therefore, the first, third and fourth logical storage areas LUN 1, LUN 3, and LUN 4 may also be described in the same manner as the second logical storage area LUN 2.

In an embodiment, according to the logical area setting command of the host, the first logical storage area LUN 1 may be set as the original storage area. The fourth logical storage area LUN 4 may be set as the backup storage area.

The number of logical storage areas set as the backup storage area is not limited to the present embodiment. That is, the number of backup storage areas may be plural.

When the memory operation is performed on the first logical storage area LUN 1, the mirroring operation may be performed on the fourth logical storage area LUN 4. The memory operation may be performed as a foreground operation according to a request of the host. The mirroring operation may be performed as a background operation according to whether the memory device is in an idle state.

Figure 5:
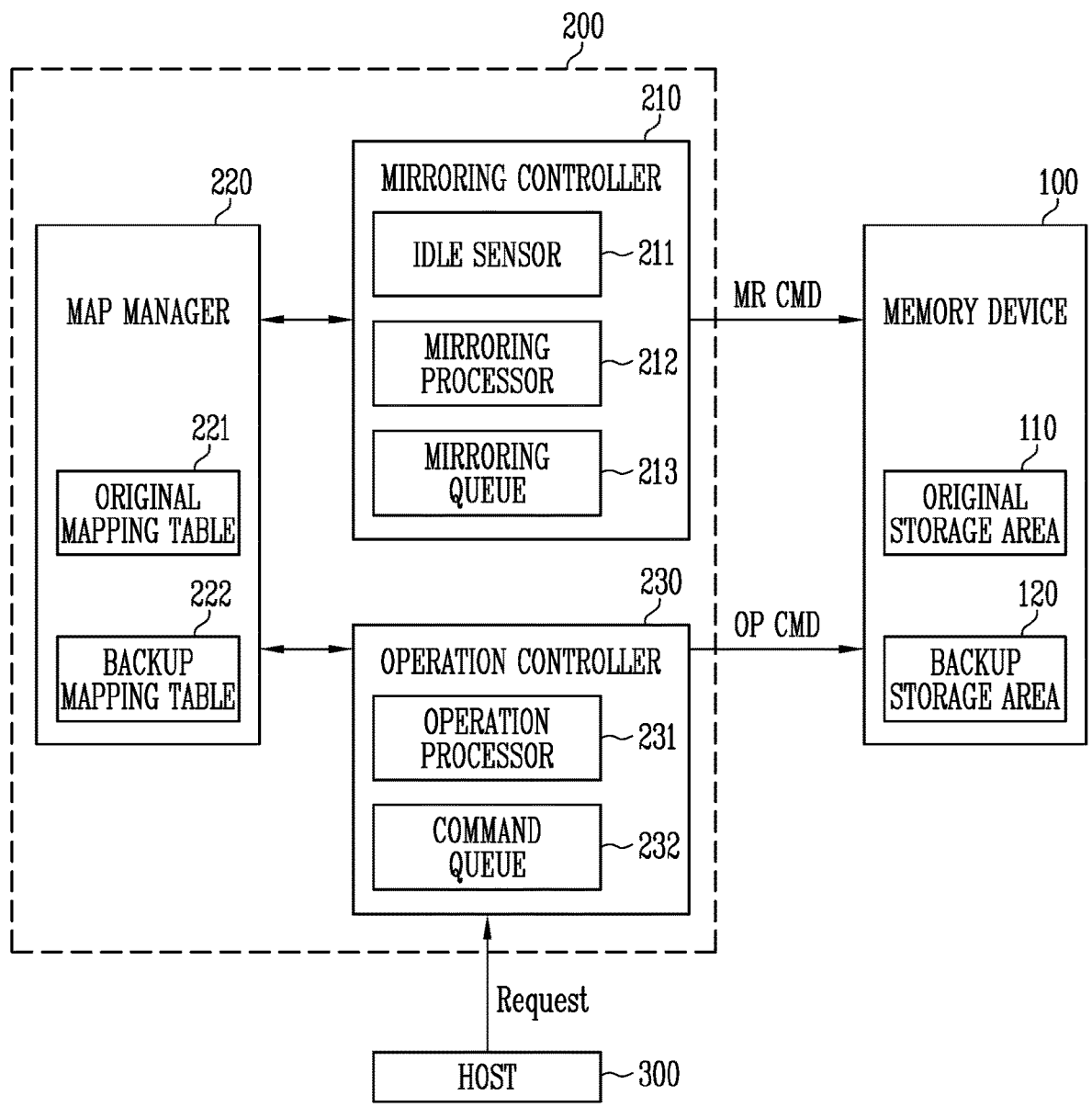
FIG. 5 is a diagram for describing a configuration and an operation of a memory controller of FIG. 1.

FIG. 5 is a diagram for describing a detailed configuration and an operation of the memory controller 200 of FIG. 1.

Referring to FIG. 5, the memory controller 200 may include the mirroring controller 210 and the map manager 220. The memory controller 200 may further include the operation controller 230.

In an embodiment, the mirroring controller 210 may include an idle sensor 211, a mirroring processor 212, and a mirroring queue 213.

The idle sensor 211 may sense whether the memory device 100 is in the idle state. The idle sensor 211 may generate idle information indicating whether the memory device 100 is in the idle state. The idle state may be a state in which the memory device 100 does not perform an operation according to the request REQ of the host 300.

The mirroring processor 212 may sense whether the memory operation is performed on the original storage area 110 based on map update information provided from the map manager 220. The memory operation may include the program operation of storing data in the original storage area 110. The memory operation may include the operation of erasing the selected storage area of the original storage area 110.

When the memory operation is performed on the original storage area 110, the mirroring processor 212 may control the memory device 100 to perform the mirroring operation that copies (or reproduces) the memory operation in the backup storage area 120.

Specifically, the mirroring processor 212 may generate at least one mirroring command MR CMD for the mirroring operation. The mirroring processor 212 may provide the generated mirroring command MR CMD to the mirroring queue 213.

The mirroring command MR CMD may include at least one of a program command, a read command, and an erase command. For example, when the memory operation is the program operation, the mirroring command MR CMD may include at least one of the read command and the program command. When the memory operation is the erase operation, the mirroring command MR CMD may include the erase command.

The mirroring processor 212 may determine whether the memory device 100 is in the idle state based on the idle information received from the idle sensor 211. The mirroring processor 212 may control the memory device 100 to perform the mirroring operation when the memory device 100 is in the idle state. That is, the mirroring processor 212 may control the memory device 100 to perform the mirroring operation in the background method.

The mirroring processor 212 may determine whether the mirroring command MR CMD queued in the mirroring queue 213 is present. The mirroring queue 213 may be controlled to provide the mirroring command MR CMD queued in the mirroring queue 213 to the memory device 100.

In an embodiment, when the memory device 100 is in the idle state, the mirror processor 212 may control the mirroring queue 213 to provide the mirroring command MR CMD to the memory device 100 according to whether the mirroring command MR CMD queued in the mirroring queue 213 is present.

In another embodiment, when the mirroring command MR CMD queued in the mirroring queue 213 is present, the mirroring processor 212 may control the mirroring queue 213 to provide the mirroring command MR CMD to the memory device 100 according to whether the memory device 100 is in the idle state.

The mirroring queue 213 may store the mirroring command MR CMD provided from the mirroring processor 212. The mirroring queue 213 may perform queuing for scheduling an order for providing the mirroring command MR CMD to the memory device 100 under control of the mirroring processor 212. The mirroring queue 213 may provide the mirroring command MR CMD that is being queued under the control of the mirroring processor 212 to the memory device 100.

The map manager 220 may store the original mapping table corresponding to the original storage area 110 and the backup mapping table corresponding to the backup storage area 120.

The map manager 220 may update the original mapping table and the backup mapping table when the memory operation is performed on the original storage area 110 by the operation controller 230. The map manager 220 may generate map update information when the original mapping table is updated. The map update information may be information indicating whether the original mapping table is updated. The map manager 220 may provide the map update information to the mirroring processor 212.

Specifically, the map manager 220 may update the original mapping table so that the physical address indicating the original storage area 110 on which the memory operation is performed and the logical address of the original storage area 110 received from the host are mapped to each other. The map manager 220 may update the backup mapping table so that the physical address indicating the original storage area 110 and the logical address of the backup storage area 120 are mapped to each other. The logical address of the backup storage area 120 may correspond to the logical address of the original storage area 110.

When the memory operation is performed but the mirroring operation is not performed, the latest valid data may be stored in the original storage area 110. Therefore, the logical address of the backup storage area 120 may be mapped to the physical address indicating the original storage area 110 rather than the physical address indicating the backup storage area 120. Since the logical address of the backup storage area 120 is mapped to the physical address indicating the original storage area 110, the latest valid data may be normally read even though the read operation is performed based on the logical address of the backup storage area 120 before the mirroring operation is performed.

The map manager 220 may update the backup mapping table when the mirroring operation is performed on the backup storage area 120 by the mirroring controller 210. Specifically, the map manager 220 may update the backup mapping table so that the physical address indicating the backup storage area 120 on which the mirroring operation is performed and the logical address of the backup storage area 120 are mapped to each other. This is because when the mirroring operation is performed, the memory operation is copied in the backup storage area 120, and the latest valid data is stored in the backup storage area 120.

The operation controller 230 may include an operation processor 231 and a command queue 232.

The operation processor 231 may generate an operation command OP CMD for performing the memory operation on the original storage area 110 in response to the request REQ of the host 300. The operation command OP CMD may include at least one of the program command and the erase command.

The operation processor 231 may provide the generated operation command OP CMD to the command queue 232. The operation processor 231 may control the command queue 232 to provide the operation command OP CMD to the memory device 100.

The command queue 232 may store the operation command OP CMD provided from the operation processor 231. The command queue 232 may provide the operation command OP CMD to the memory device 100 under control of the operation processor 231.

Figure 6:
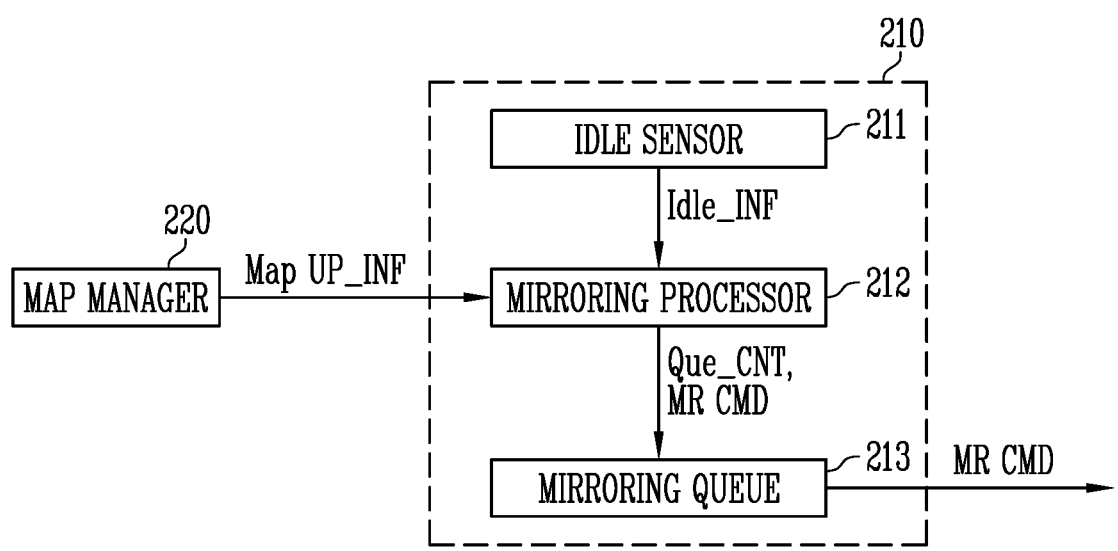
FIG. 6 is a diagram for describing a configuration and an operation of a mirroring controller of FIG. 5.

FIG. 6 is a diagram for describing a configuration and an operation of the mirroring controller of FIG. 5.

Referring to FIG. 6, the mirroring controller 210 may include the idle sensor 211, the mirroring processor 212, and the mirroring queue 213.

The idle sensor 211 may sense whether the memory device 100 is in the idle state. The idle sensor 211 may generate the idle information Idle_INF indicating whether the memory device 100 is in the idle state. The idle state may be a state in which the memory device 100 does not perform an operation according to the request of the host 300.

The mirroring processor 212 may sense whether the memory operation is performed on the original storage area 110 based on map update information Map UP_INF provided from the map manager 220.

When the memory operation is performed on the original storage area 110, the mirroring processor 212 may generate at least one mirroring command MR CMD for the mirroring operation. The mirroring operation may be an operation in which the memory operation is copied in the backup storage area 120. The mirroring processor 212 may provide the generated mirroring command to the mirroring queue 213.

The mirroring processor 212 may determine whether the memory device 100 is in the idle state according to the idle information Idle_INF received from the idle sensor 211. The mirroring processor 212 may control the mirroring queue 213 to provide the mirroring command MR CMD queued by the mirroring queue 213 to the memory device through queue control information Que_CNT. The queuing may be scheduling the order of providing the mirroring command MR CMD to the memory device.

In an embodiment, when the memory device 100 is in the idle state, the mirroring processor 212 may control the mirroring queue 213 to provide the mirroring command MR CMD to the memory device according to whether the mirroring queue 213 is queuing the mirroring command MR CMD.

In another embodiment, when the mirroring queue 213 is queuing the mirroring command MR CMD, the mirroring processor 212 may control the mirroring queue 213 to provide the mirroring command MR CMD to the memory device according to whether the memory device 100 is in the idle state.

The mirroring queue 213 may store the mirroring command MR CMD provided from the mirroring processor 212. The mirroring queue 213 may provide the mirroring command MR CMD to the memory device in response to the queue control information Que_CNT.

Figure 7:
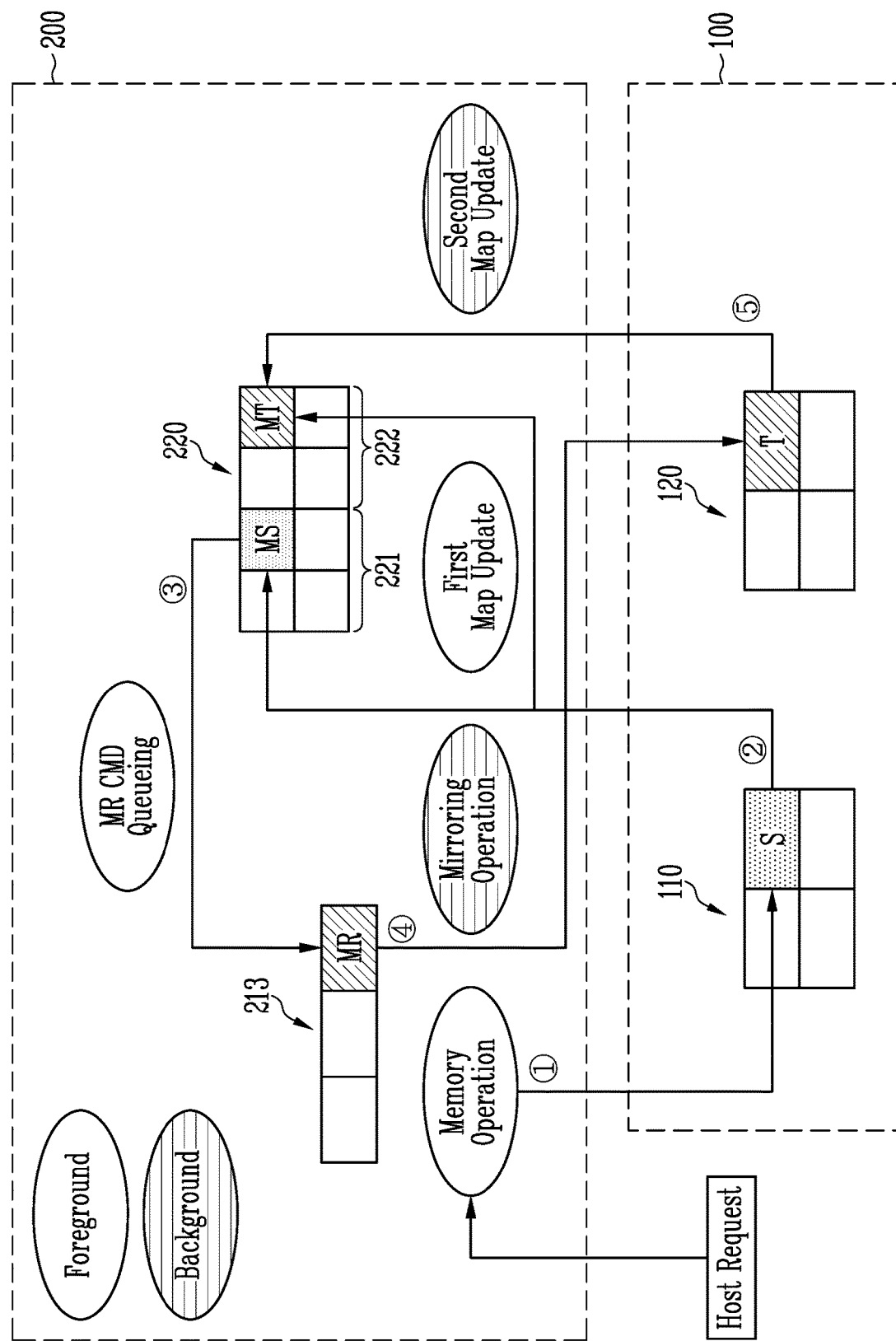
FIG. 7 is a diagram for describing a memory operation and a mirroring operation according to an embodiment of the present disclosure.

FIG. 7 is a diagram for describing the memory operation and the mirroring operation according to an embodiment of the present disclosure.

Referring to FIG. 7, the memory operation may be performed on a source area S that is the selected storage area of the original storage area 110, according to the request of the host. The memory operation may include a program operation of storing data in the source area S. The memory operation may include an operation of erasing the source area S.

When the memory operation is performed on the source area S, a first map memory operation of updating an original mapping table 221 and a backup mapping table 222 may be performed. In the original mapping table 221, source map data MS may include a logical address of the source area S. In the backup mapping table 222, target map data MT may include a logical address of a target area T.

In the first map memory operation, the source map data MS of the original mapping table 221 may be updated so that the logical address of the source area S received from the host and the physical address indicating the source area S are mapped to each other. In the first map memory operation, the target map data MT of the backup mapping table 222 may be updated so that the logical address of the target area T corresponding to the logical address of the source area S and the physical address indicating the source area S are mapped to each other.

When the first map memory operation is completed, at least one mirroring command MR for the mirroring operation may be queued in the mirroring queue 213. The mirroring operation may be an operation of performing the memory operation, which is performed on the source area S, on the target area T of the backup storage area 120. The mirroring command may be the read command, the program command, or the erase command.

When the mirroring command MR is queued in the mirroring queue 213, the mirroring operation may be performed according to whether the memory device is in the idle state. Alternatively, when the memory device is in the idle state, the mirroring operation may be performed according to whether the mirroring command MR is queued in the mirroring queue 213.

When the memory device is in the idle state, the mirroring operation may be performed on the target area T of the backup storage area 120 based on the mirroring command MR queued in the mirroring queue 213. The target area T may be an area corresponding to the source area S of the original storage area 110.

When the mirroring operation is performed, a second map memory operation of updating the backup mapping table 222 may be performed. In the second map memory operation, the target map data MT of the backup mapping table 222 may be updated so that the logical address of the target area T and the physical address indicating the target area T are mapped to each other.

In FIG. 7, the memory operation, the first map update, and the mirroring command queuing may be performed in a foreground operation. The mirroring operation and the second map update may be performed in a background operation.

According to an embodiment of the present disclosure, when the memory operation is performed on the original storage area 110 according to the request of the host, the mirroring operation may be asynchronously performed on the backup storage area 120 according to whether the memory device is in the idle state. Therefore, when the memory operation is performed on the storage device according to the request of the host, there are advantages in that the storage device senses whether the memory operation is performed by itself without control of the host after the memory operation and performs the mirroring operation. Since the asynchronous mirroring operation is performed when the memory device is in the idle state, quality of service (QoS) may be improved.

The storage device may store a data file in the original storage area 110 and the backup storage area 120 under the control of the host. In this case, a time tDownload may be taken for each storage area. The total download time may be 2*tDownload. For example, when the number of backup storage areas increases from one to two, the total download time may increase to 3*tDownload. That is, when the data file is stored in the backup storage area under the control of the host, the total download time may increase.

However, according to the present embodiment, even though the data file is stored only in the original storage area 110 without having to store the data file in the backup storage area 120, when the storage device is in the idle state, the same data as the data stored in the area 110 may be stored in the backup storage area 120. Therefore, since the data file is required to be stored only in the original storage area 110 regardless of the backup storage area 120 under the control of the host, the total download time may be improved to tDownload.

Figure 8:
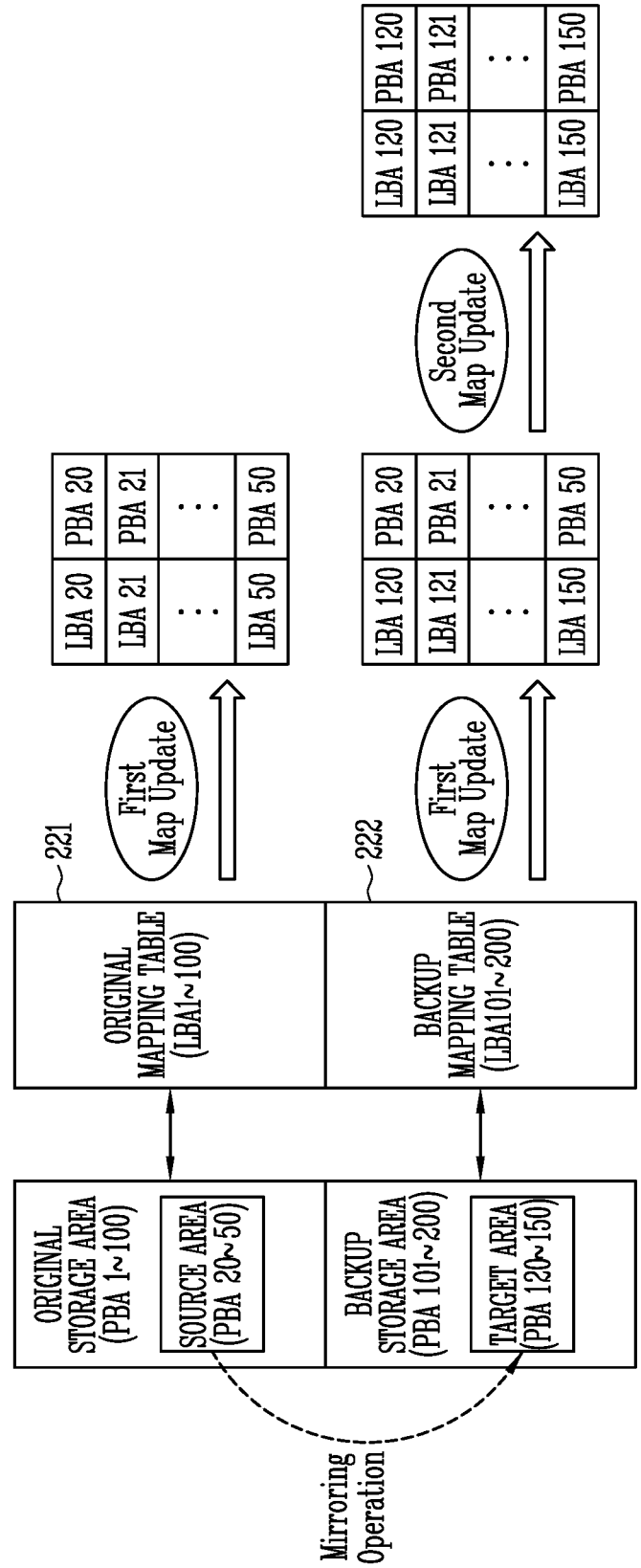
FIG. 8 is a diagram for describing map update of FIG. 7.

FIG. 8 is a diagram for describing the map update of FIG. 7.

Referring to FIGS. 4 and 8, the backup storage area of the plurality of logical storage areas may be a storage area used for mirroring the original storage area.

In FIG. 8, the physical address indicating the original storage areas may be PBA1 to PBA100. The physical address indicating the source area of the original storage area may be PBA20 to PBA50. The physical address indicating the backup storage area may be PBA101 to PBA200. The physical address indicating the target area among the backup storage areas may be PBA120 to PBA150. The target area may be a storage area used for mirroring the source area.

The physical address indicating each storage area is not limited to the present embodiment.

The original mapping table 221 corresponding to the original storage area may include logical addresses LBA1 to LBA100 of the original storage area. The logical address of the source area of the original storage area may be LBA20 to LBA50. The backup mapping table 222 corresponding to the backup storage area may include logical addresses LBA101 to LBA200 of the backup storage area. The logical address of the target area of the backup storage area may be LBA120 to LBA150.

As described with reference to FIG. 7, when the memory operation is performed on the source area, the first map memory operation may be performed.

In the first map memory operation, the original mapping table 221 may be updated so that the logical address LBA20 to LBA50 of the source area and the physical address PBA20 to PBA50 indicating the source area are mapped to each other.

In the first map memory operation, the backup mapping table 222 may be updated so that the logical address LBA120 to LBA150 of the target area and the physical address PBA20 to PBA50 indicating the source area are mapped to each other.

After the memory operation is performed and before the mirroring operation is performed, since the memory operation, which is performed on the source area, is not copied (or reproduced) in the target area, the logical address of the target area may be mapped to the physical address of the source area. Therefore, even though the read operation is performed based on the logical address of the target area, valid data may be normally read with reference to the physical address of the source area.

When the mirroring operation is performed on the target area, the second map memory operation may be performed. In the second map memory operation, the backup mapping table 222 may be updated so that the logical address LBA120 to LBA150 of the target area and the physical addresses PBA120 to PBA150 indicating the target area are mapped to each other.

When the mirroring operation is performed, since the memory operation performed on the source area is copied in the target area, the logical address of the target area may be mapped to the physical address of the target area.

Figure 9:
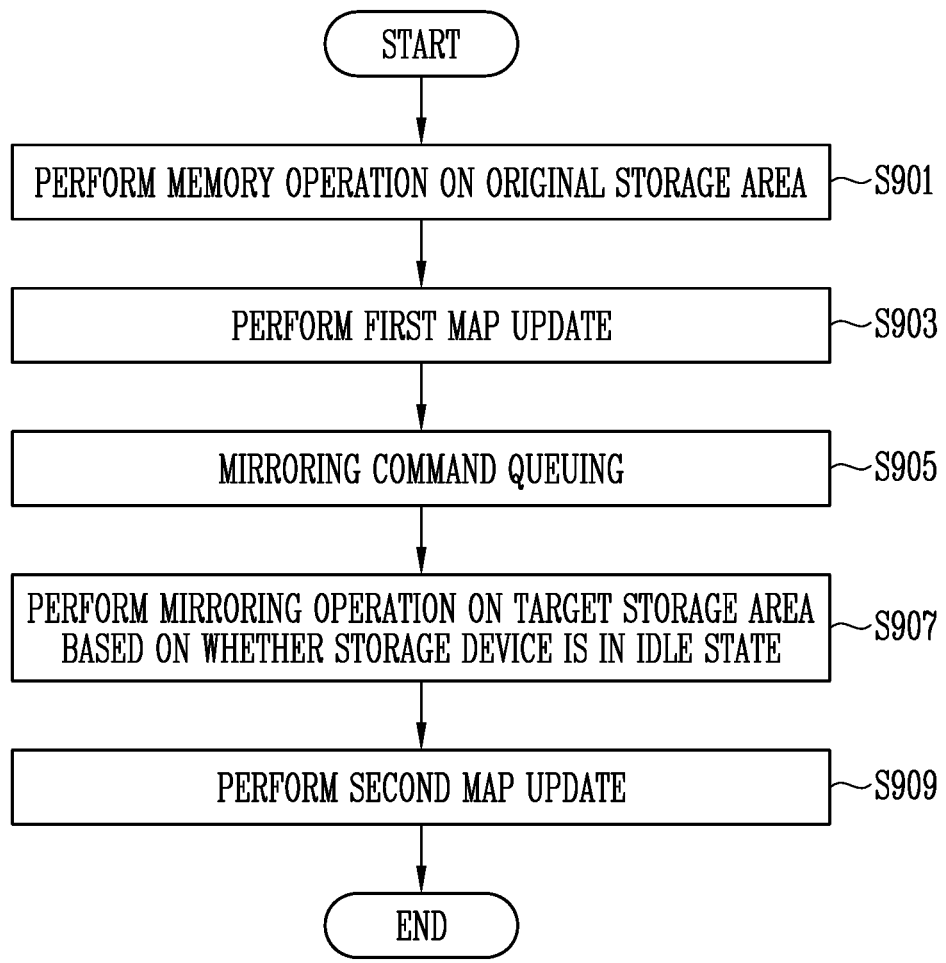
FIG. 9 is a flowchart for describing an operation of the storage device according to an embodiment of the present disclosure.

FIG. 9 is a flowchart for describing an operation of the storage device according to an embodiment of the present disclosure.

Referring to FIG. 9, in step S901, the storage device may perform the memory operation on the original storage area. The memory operation may be an operation of programming data in the original storage area or erasing data stored in the original storage area.

In step S903, the storage device may perform the first map update. As described with reference to FIG. 8, in the first map update, the original mapping table corresponding to the original storage area and the backup mapping table corresponding to the backup storage area may be updated. The original mapping table may include the logical address of the original storage area. The backup mapping table may include the logical address of the backup storage area.

Specifically, the original mapping table may be updated so that the logical address of the original storage area received from the host and the physical address indicating the original storage area are mapped to each other. The backup mapping table may be updated so that the logical address of the backup storage area corresponding to the logical address of the original storage area and the physical address indicating the original storage area are mapped to each other.

In step S905, the storage device may queue the mirroring command for the mirroring operation. The mirroring operation may be an operation in which the memory operation performed on the original storage area is copied in the target storage area. The storage device may sense whether the memory operation is performed on the original storage area, and when the memory operation is performed, the storage device may queue the mirroring command for the mirroring operation.

In step S907, the storage device may perform the mirroring operation on the target storage area based on whether the storage device is in the idle state. The storage device may perform the mirroring operation based on the mirroring command queued in the mirroring queue when the storage device is in the idle state.

In step S909, the storage device may perform the second map update. In the second map update, the backup mapping table may be updated so that the logical address of the target storage area and the physical address indicating the target storage area on which the mirroring operation is performed are mapped to each other.

Figure 10:
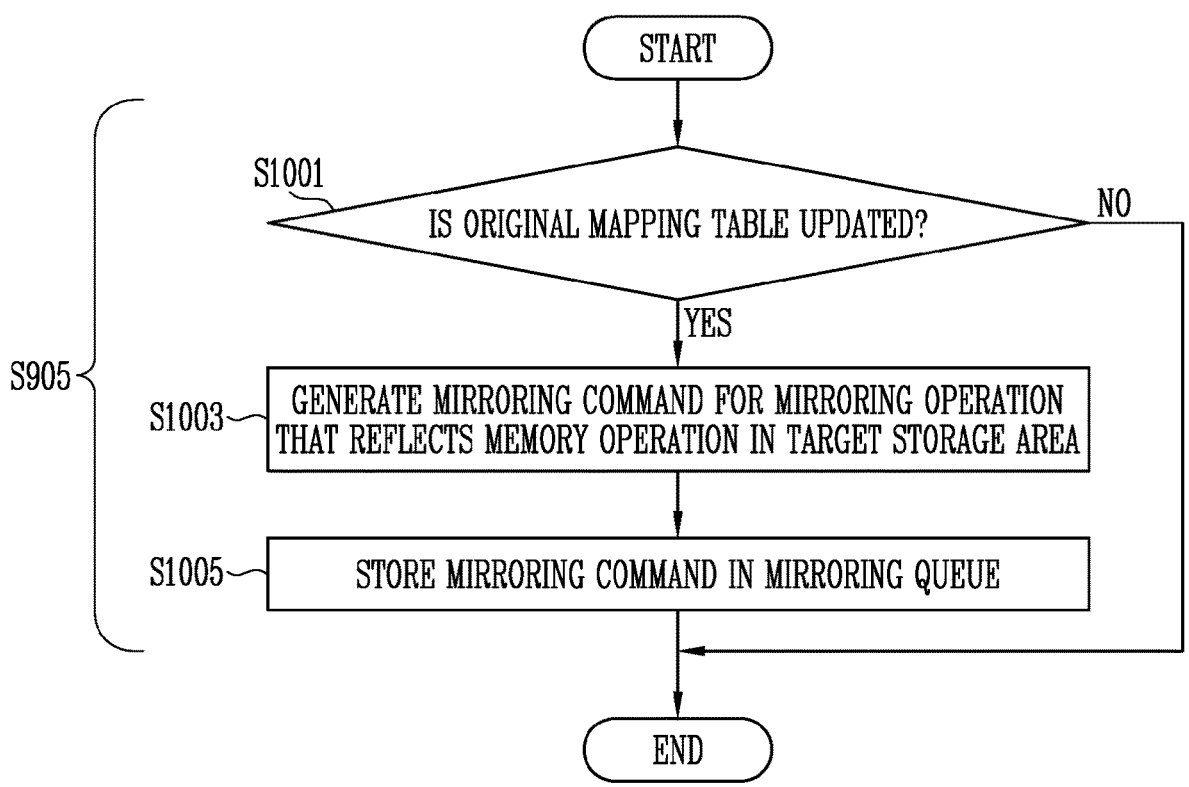
FIG. 10 is a flowchart for describing mirroring command queuing of FIG. 9.

FIG. 10 is a flowchart for describing the mirroring command queuing of FIG. 9.

Referring to FIG. 10, step S905 of FIG. 9 may include steps S1001 to S1005.

In step S1001, the storage device may determine whether the original mapping table is updated. As a result of the determination, when the original mapping table is updated, the operation proceeds to step S1003, and when the original mapping table is not updated, the operation is ended.

In an embodiment, when the original mapping table is updated, the storage device may generate the map update information indicating whether the original mapping table is updated. The storage device may determine whether the original mapping table is updated based on the map update information.

In step S1003, the storage device may generate the mirroring command for the mirroring operation. The mirroring operation may be an operation in which the memory operation performed on the original storage area is copied in the target storage area.

In step S1005, the storage device may store the generated mirroring command in the mirroring queue.

Figure 11:
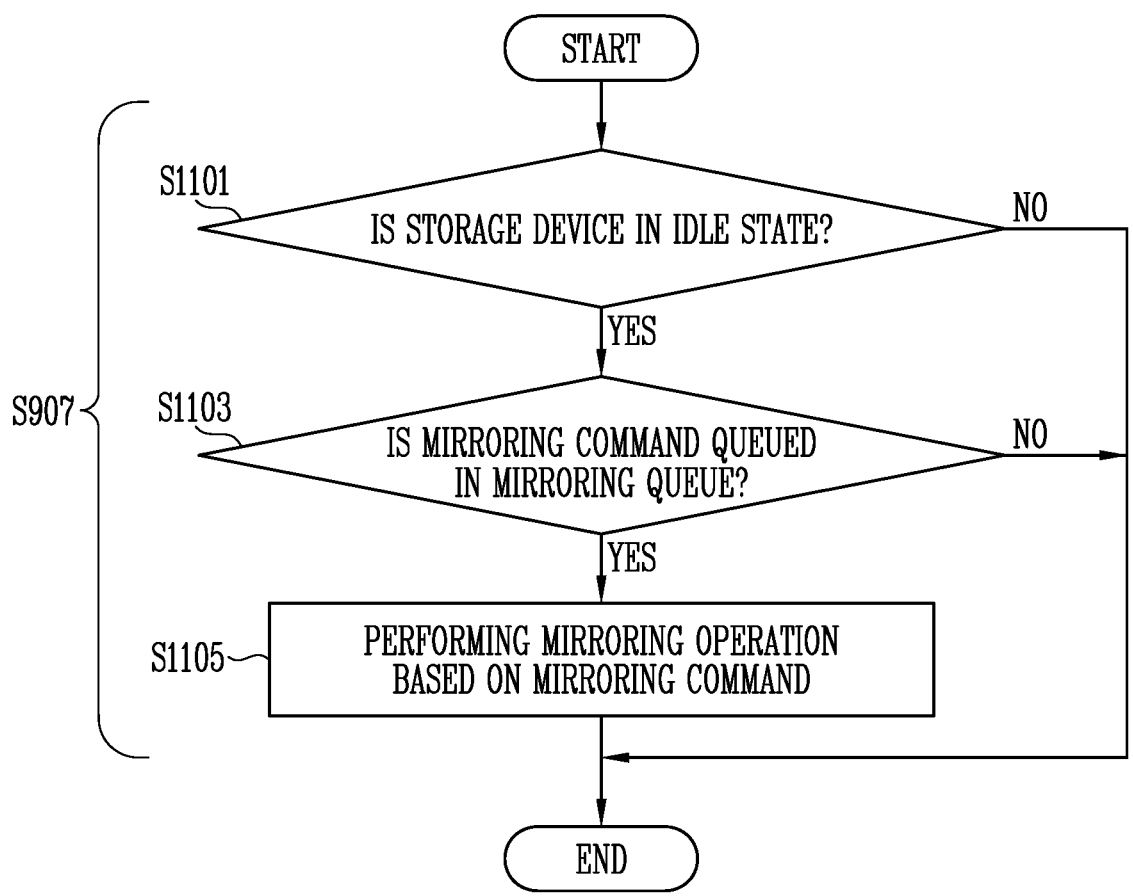
FIG. 11 is a flowchart for describing a mirroring operation of FIG. 9.

FIG. 11 is a flowchart for describing the mirroring operation of FIG. 9.

Referring to FIG. 11, step S907 of FIG. 9 may include steps S1101 to S1105.

In step S1101, the storage device may determine whether the storage device is in the idle state. As a result of the determination, when the storage device is in the idle state, the operation may proceed to step S1103, and when the storage device is in a busy state, the operation may be ended. The busy state may be a state in which the storage device is performing an operation according to the request of the host.

In step S1103, the storage device may determine whether the mirroring command is queued in the mirroring queue. As a result of determination, when the command is queued in the mirroring queue, the operation proceeds to step S1105, and when the command queued in the mirroring queue is not present, the operation is ended.

In step S1105, the storage device may perform the mirroring operation based on the mirroring command queued in the mirroring queue.

In various embodiments, an order of steps S1101 and S1103 may be reversed. That is, after first determining whether the mirroring command is queued in the mirroring queue, it may be determined whether the storage device is in the idle state when the mirroring command queued in the mirroring queue is present. When the storage device is in the idle state, the operation may proceed to step S1105.

Figure 12:
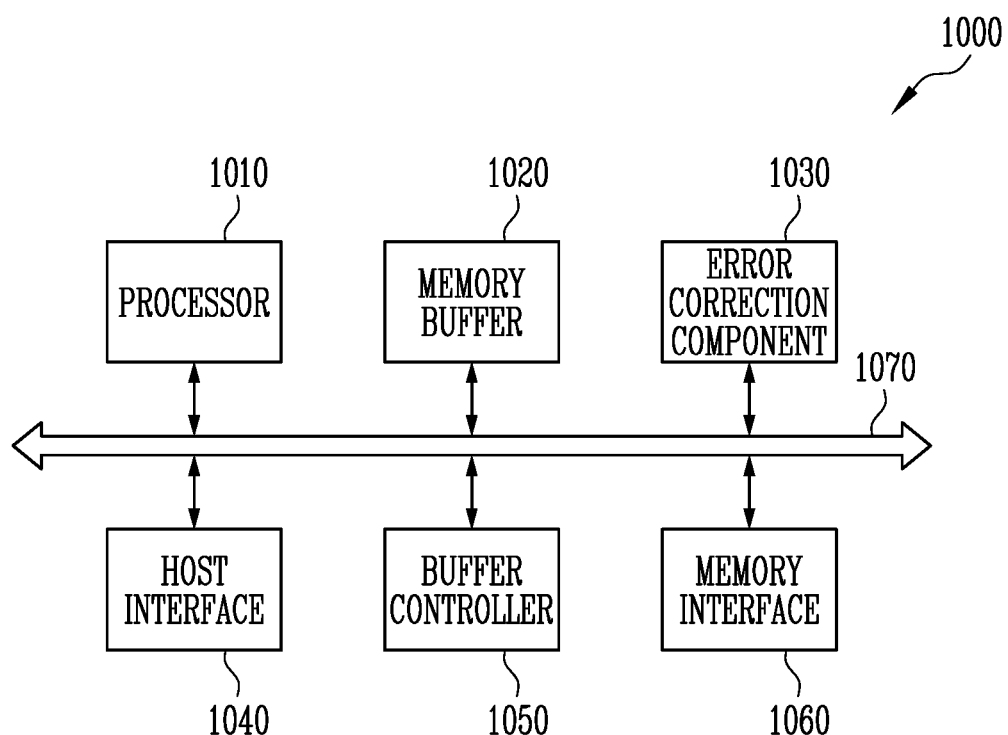
FIG. 12 is a diagram for describing another embodiment of the memory controller of FIG. 1.

FIG. 12 is a diagram for describing an embodiment of the memory controller 200 of FIG. 1. A memory controller 1000 may correspond to the memory controller 200 of FIG. 1.

Referring to FIG. 12, the memory controller 1000 is connected to a host (not shown) and a memory device (not shown). The memory controller 1000 is configured to access the memory device in response to the request from the host Host. For example, the memory controller 1000 is configured to control the write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error correction component (ECC) 1030, a host interface 1040, a buffer controller 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the flash translation layer (FTL). The flash translation layer (FTL) may receive the logical block address (LBA) using a mapping table and convert the logical block address (LBA) into the physical block address (PBA). An address mapping method of the flash translation layer may include various methods according to a mapping unit. A representative address mapping method includes a page mapping method, a block mapping method, and a hybrid mapping method.

The processor 1010 is configured to randomize data received from the host Host. For example, the processor 1010 may randomize the data received from the host Host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction component 1030 may perform error correction. The error correction component 1030 may perform error correction encoding (ECC encoding) based on data to be written to the memory device through memory interface 1060. The error correction encoded data may be transferred to the memory device through the memory interface 1060. The error correction component 1030 may perform error correction decoding (ECC decoding) on the data received from the memory device through the memory interface 1060. For example, the error correction component 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error correction component 1030, and the memory interface 1060. The control bus may be connected to the host interface 1040, the processor 1010, the buffer controller 1050, the memory buffer 1202, and the memory interface 1060.

In an embodiment, the mirroring controller 210, the map manager 220, and the operation controller 230 shown in FIG. 1 may be included in the processor 1010.

Figure 13:
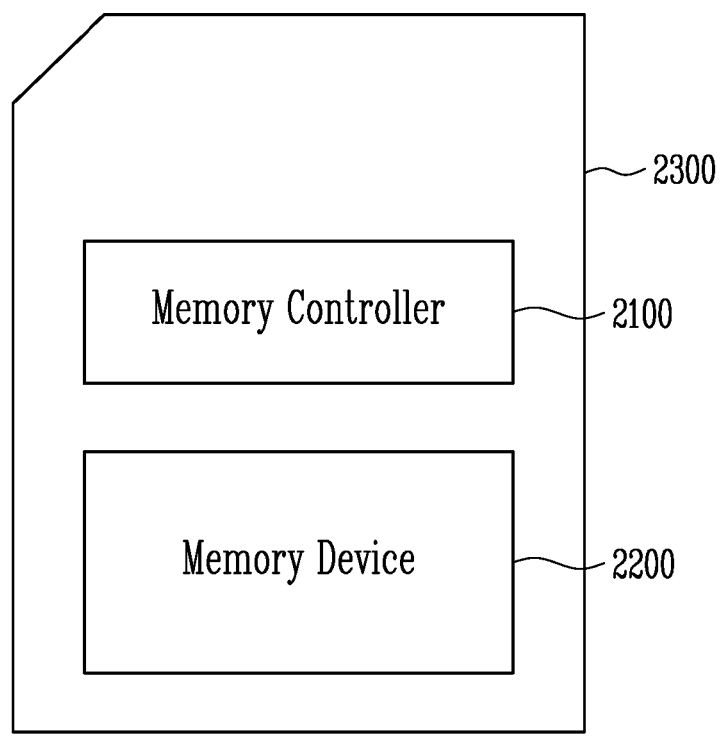
FIG. 13 is a block diagram illustrating a memory card system to which the storage device according to an embodiment of the present disclosure is applied.

FIG. 13 is a block diagram illustrating a memory card system 2000 to which the storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error correction component.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
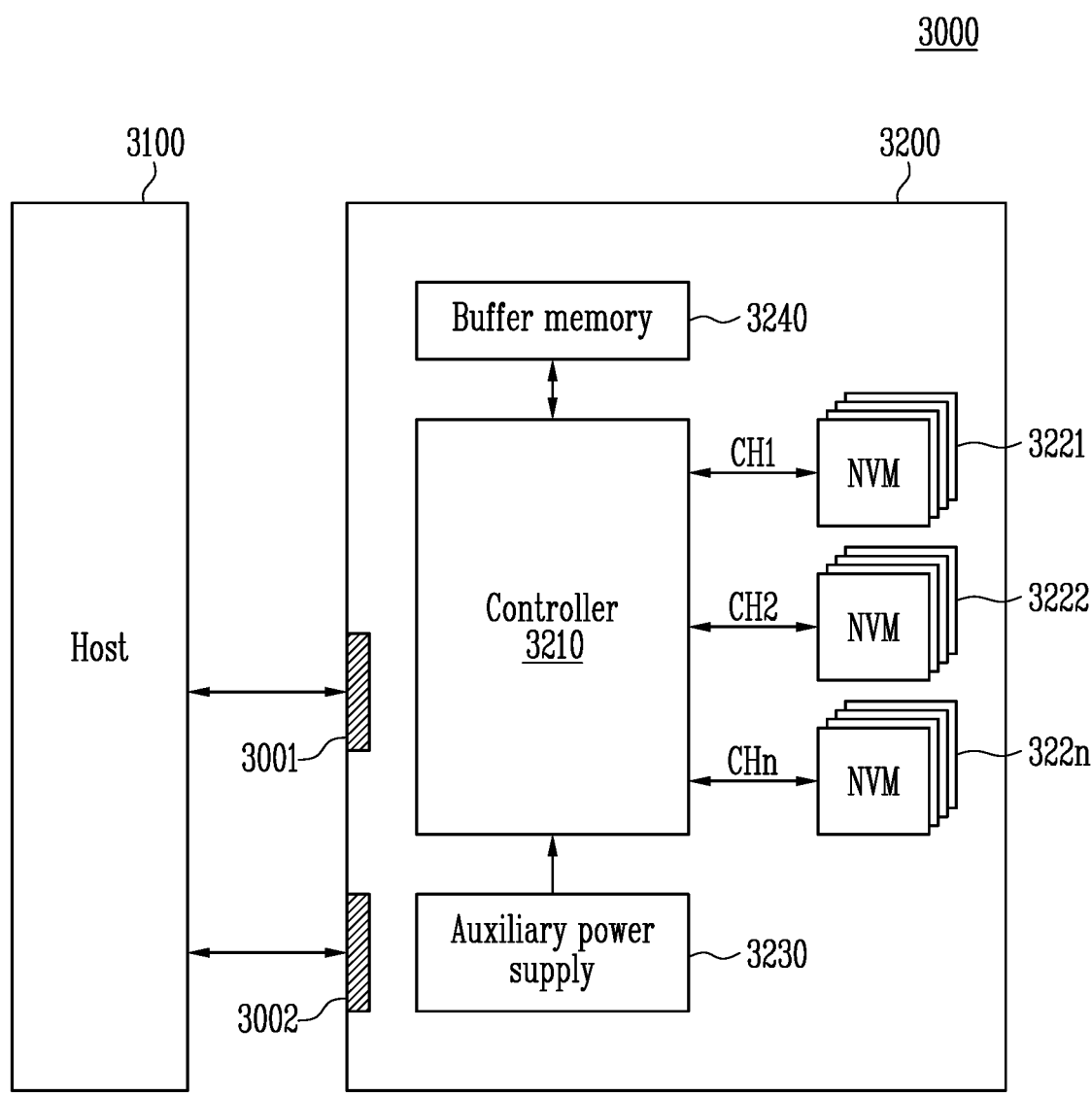
FIG. 14 is a block diagram illustrating a storage device system to which the storage device according to an embodiment of the present disclosure is applied.

FIG. 14 is a block diagram illustrating a storage device system 3000 to which the storage device according to an embodiment of the present disclosure is applied.

Referring to FIG. 14, the storage device system 3000 includes a host 3100 and a storage device 3200. The storage device 3200 exchanges a signal SIG with the host 3100 through a signal connector 3001 and receives power PWR through a power connector 3002. The storage device 3200 includes a controller 3210, a plurality of flash memories 3221 to 322n, an auxiliary power supply 3230, and a buffer memory 3240.

According to an embodiment of the present disclosure, the controller 3210 may perform the function of the memory controller 200 described with reference to FIG. 1.

The controller 3210 and the plurality of flash memories 3221 to 322n may communicate with each other through respective channels CH1 to CHn. The controller 3210 may control the plurality of flash memories 3221 to 322n in response to the signal SIG received from the host 3100. For example, the signal SIG may be signals based on an interface between the host 3100 and the storage device 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power PWR from the host 3100 and may charge the power. The auxiliary power supply 3230 may provide power of the storage device 3200 when power supply from the host 3100 is not smooth. For example, the auxiliary power supply 3230 may be positioned in the storage device 3200 or may be positioned outside the storage device 3200. For example, the auxiliary power supply 3230 may be positioned on a main board and may provide auxiliary power to the storage device 3200.

The buffer memory 3240 operates as a buffer memory of the storage device 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 15:
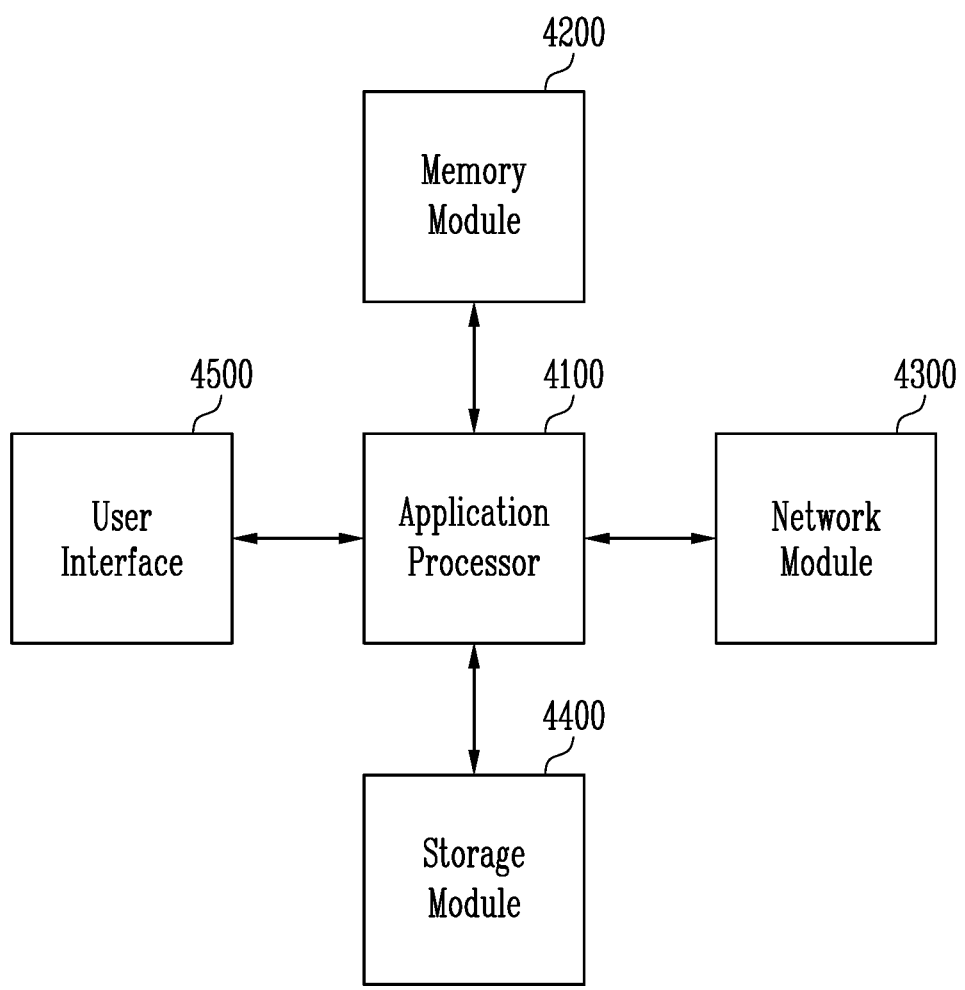
FIG. 15 is a block diagram illustrating a user system to which the storage device according to an embodiment of the present disclosure is applied.

FIG. 15 is a block diagram illustrating a user system 4000 to which the storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data, an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A storage device comprising:
   a memory device including a plurality of logical storage areas; and
   a memory controller configured to control the memory device to perform a memory operation on an original storage area of the plurality of logical storage areas according to a request of a host, and to perform a mirroring operation of copying the memory operation which was performed on the original storage area in a backup storage area of the plurality of logical storage areas based on whether the memory device is in an idle state,
   wherein the memory controller is configured to determine whether the memory operation is performed on the original storage area, and control the memory device to perform the mirroring operation based on whether the memory device is in the idle state.

2. The storage device of claim 1, wherein the memory controller sets the original storage area and the backup storage area, in response to a logical area setting command received from the host.

3. The storage device of claim 1, wherein the memory controller comprises:
   a map manager configured to store an original mapping table corresponding to the original storage area and a backup mapping table corresponding to the backup storage area, and generate map update information in response to the original mapping table being updated; and
   a mirroring controller configured to determine whether the memory operation is performed on the original storage area based on the map update information, and control the memory device to perform the mirroring operation based on whether the memory device is in the idle state.

4. The storage device of claim 3, wherein the mirroring controller comprises:
   an idle sensor configured to sense whether the memory device is in the idle state to generate idle information;
   a mirroring processor configured to generate at least one mirroring command for the mirroring operation based on the map update information; and
   a mirroring queue configured to store the at least one mirroring command.

5. The storage device of claim 4, wherein the mirroring processor controls the mirroring queue to provide the at least one mirroring command to the memory device based on the idle information.

6. The storage device of claim 3, wherein the mirroring controller controls the memory device to perform the mirroring operation on a target area of the backup storage area, the target area corresponding to a source area on which the memory operation is performed in the original storage area.

7. The storage device of claim 6, wherein the map manager updates the original mapping table according to the memory operation, and updates the backup mapping table according to the updated original mapping table or the mirroring operation.

8. The storage device of claim 7, wherein after the memory operation, the map manager maps a source logical address provided by the host to a source physical address indicating the source area, and maps a target logical address corresponding to the source logical address to the source physical address.

9. The storage device of claim 8, wherein after the mirroring operation, the map manager maps the target logical address to a target physical address indicating the target area.

10. The storage device of claim 6, wherein the memory operation is a program operation, and the mirroring operation includes an operation of programming the same data as data stored in the source area on which the program operation is performed, to the target area.

11. The storage device of claim 6, wherein the memory operation is an erase operation, and the mirroring operation includes an operation of erasing the target area corresponding to the source area on which the erase operation is performed.

12. The storage device of claim 1, wherein the memory controller includes an operation controller configured to control the memory device to perform the memory operation in response to the request of the host,
   wherein the operation controller comprises:
   a command queue configured to store at least one operation command for the memory operation; and
   an operation processor configured to generate the at least one operation command in response to the request of the host, and control the command queue to provide the at least one operation command to the memory device.

13. A method of operating a storage device including a mirroring queue, an original storage area, and a backup storage area, the method comprising:

queuing, in the mirroring queue, at least one mirroring command for a mirroring operation of copying a memory operation which was performed on the original storage area in the backup storage area;

performing the mirroring operation according to the queued at least one mirroring command based on whether the storage device is in an idle state; and updating, before the queuing of the at least one mirroring command, an original mapping table corresponding to the original storage area and a backup mapping table corresponding to the backup storage area according to the memory operation.

14. The method of claim 13, further comprising:
setting the original storage area and the backup storage area used for mirroring the original storage area, in response to a logical area setting command received from a host.

15. The method of claim 13, further comprising:
performing, before the queuing of the at least one mirroring command, the memory operation on the original storage area in response to a request of a host,
wherein the memory operation is a program operation or an erase operation.

16. The method of claim 15, wherein the performing of the mirroring operation comprises:
determining whether the storage device is in the idle state; and
performing the mirroring operation according to the queued at least one mirroring command in response to the storage device being in the idle state.

17. The method of claim 13, further comprising:
updating, after the performing of the mirroring operation, the backup mapping table.

18. The method of claim 13, wherein the queuing of the at least one mirroring command comprises:
determining whether the memory operation is performed in response to the original mapping table being updated; and queuing the at least one mirroring command in the mirroring queue in response to the memory operation being performed.

19. A method of operating a storage device including a memory controller and a memory device, the method comprising:

performing a memory operation on an original storage area included in the memory device;

updating an original mapping table corresponding to the original storage area and a backup mapping table corresponding to a backup storage area included in the memory device;

after the updating the original mapping table, queueing, in a mirroring queue included in the memory controller, a mirroring command for a mirroring operation when the memory operation is determined to be performed;

performing the mirroring operation of copying the memory operation which was performed on the original storage area, in the backup storage area when the storage device is determined to be in an idle state; and updating the backup mapping table to map a logical address of a target storage area included in the backup storage area to a physical address of the target storage area on which the mirroring operation is performed.

20. A controller configured to:
control a second external to perform a memory operation on a first area of a plurality of logical storage areas according to a request of a first external, and to perform a mirroring operation of copying the memory operation which was performed on the first area in a second area of the plurality of logical storage areas based on whether the second external is in an idle state, determine whether the memory operation is performed on the first area, and control the second external to perform the mirroring operation based on whether the second external is in the idle state.

* * * * *